Sept. 22, 1970  J. H. LEMELSON  3,530,029
COMPOSITE SHEET FORMING APPARATUS AND METHOD
Filed Nov. 12, 1968
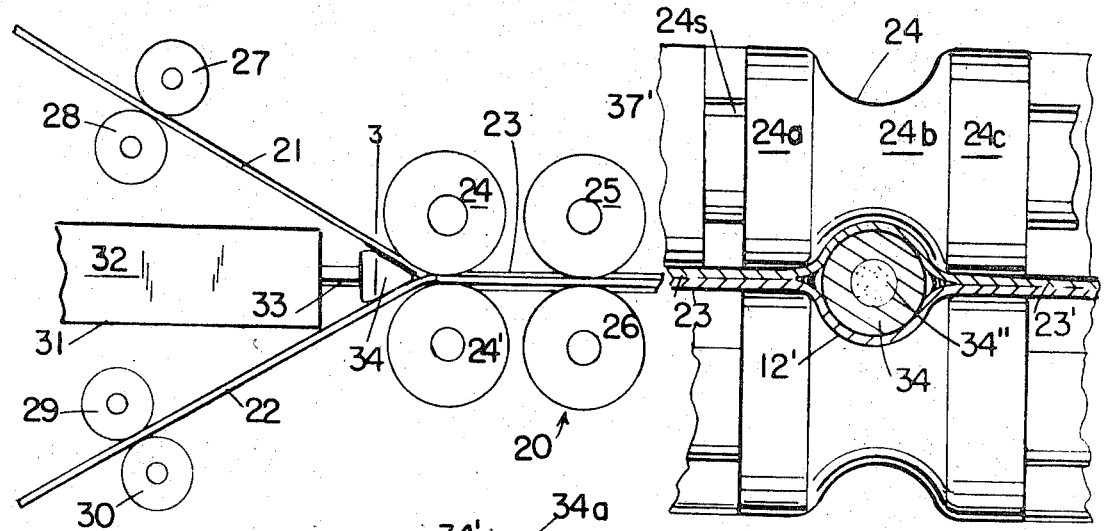
FIG. 2
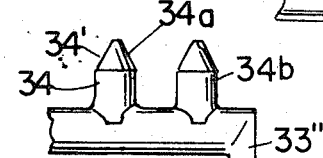
FIG. 2'
FIG. 3
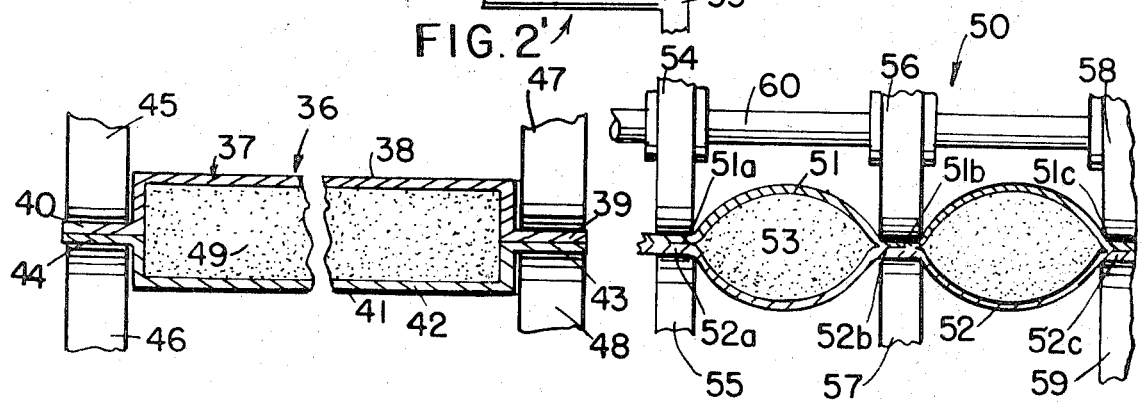
FIG. 4
FIG. 5
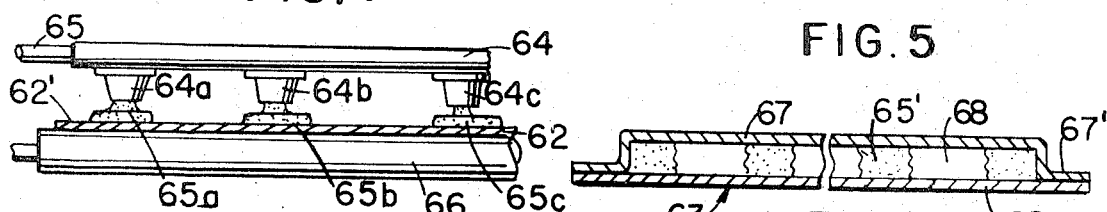
FIG. 6
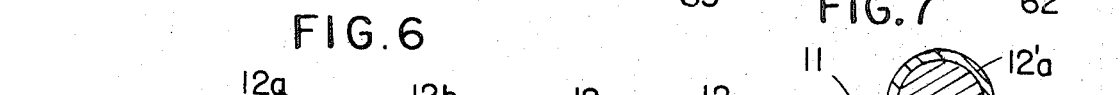
FIG. 7
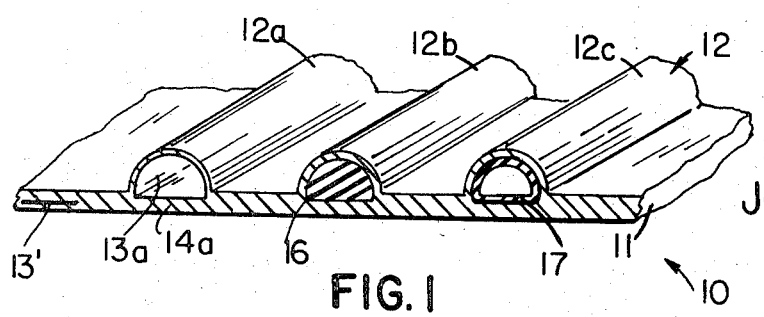
FIG. 1
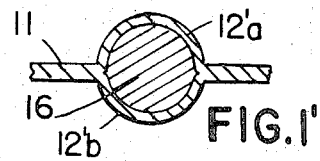
FIG. 1'
INVENTOR.
Jerome H. Lemelson

United States Patent Office 3,530,029
Patented Sept. 22, 1970

3,530,029
COMPOSITE SHEET FORMING APPARATUS
AND METHOD
Jerome H. Lemelson, 85 Rector St.,
Metuchen, N.J. 08840
Continuation-in-part of applications Ser. No. 589,848,
May 28, 1956, and Ser. No. 331,000, Dec. 16, 1963.
This application Nov. 12, 1968, Ser. No. 774,647
Int. Cl. B22b 5/20; B31f 1/24
U.S. Cl. 156—594                    15 Claims

ABSTRACT OF THE DISCLOSURE

An apparatus and method for forming composite sheet materials or panels on a continuous basis. In one form, two sheets of material are fed and brought together after deforming at least one of the sheets to provide one or more continuous longitudinal passageways defined by the two sheets. A third material, preferably in a fluent or molten state, is fed between the sheets and is prevented from flowing laterally by weld lines provided continuously as the sheets are fed together. The material either is fed in such a manner as to completely fill the passageway or passageways between the sheets or is expanded into a cellular mass between said sheets shortly after being fed thereto. Other forms of the invention include means for selectively expanding composite sheet materials to provide portions which are expanded and other portions which are unexpanded.

RELATED APPLICATIONS

This is a continuation-in-part of application Ser. No. 331,000 filed Dec. 16, 1963, now U.S. Pat. 3,409,961, entitled, Apparatus for Making Composite Sheet Materials having as a parent application Ser. No. 589,848 filed May 28, 1956 now U.S. Pat. 3,166,829, for Ducted Sheeting Construction.

SUMMARY OF THE INVENTION

This invention relates to an apparatus and method for forming composite sheet materials having portions or layers thereof which vary in physical and chemical characteristics and cooperate to provide a new and improved composite sheet. The apparatus is designed for the continuous production of said sheet materials under controlled conditions.

In one form of the instant invention, two sheets are continuously fed together after either or both of said sheets are deformed with one or more corrugations therein so as to define passageways therebetween. The sheets are continuously welded at the sides of the corrugations to laterally seal same so that a fluent reinforcing material may be extruded or injected between the sheets without laterally flowing outwardly from the sheets. The reinforcing material may comprise a polymer in a molten condition and, in certain instances, said polymer may contain an expanding or blowing agent and may be fed in a manner such that it expands in situ within the passageway or passageways so formed between the sheets and provides an internal reinforcement for the sheets.

In another form, the two sheets may be continuously formed by extrusion, deformed after being so formed and welded to form a unitary structure. The reinforcing material may be continuously fed in a fluent or molten state from a nozzle or an extruder between the sheets, thereby providing a continuous process for forming panels and the like without interruption and without the need for human attendance.

It is known in the art to form composite panels on an intermittent basis by aligning equal lengths of sheet materials, disposing a preformed reinforcing material therebetween and compressing the three layers in a press to form a length of panel thereof. Such technique is relatively costly because of the handling required of the roll materials and the machine time required while the composite panel solidifies or has its components bonded together.

Accordingly, it is a primary object of this invention to provide a new and improved apparatus and method for forming composite sheet materials which are usable as structural and non-structural panels in the fabrication of various products.

Another object is to provide an improved apparatus and method for continuously forming a plurality of materials and joining same to form a composite sheet material on a continuous basis.

Another object is to provide an improved apparatus and method for forming multilayer sheet materials including a core made of an expanded plastic and capping sheets defining the opposite surfaces of the composite panel.

Another object is to provide an improved method for forming a composite sheet material having expanded and non-expanded portions thereof so as to derive varying degrees of resiliency and flexibility.

With the above and such other objects in view as may hereafter more fully appear, the invention consists of the novel constructions, combinations and arrangements or parts as will be more fully described and illustrated in the accompanying drawings, but it is to be understood that changes, variations and modifications may be resorted to which fall within the scope of the invention as claimed.

In the drawings:

FIG. 1 is an isometric view of a fragment of a ducted sheet material showing structures including a reinforcing material retained within certain of the duct formations in the sheeting;

FIG. 1' is an end view taken in cross section of a fragment of a ducted sheet material modified in shape of that of FIG. 1;

FIG. 2 is a side view showing apparatus operative for producing sheet material of the type illustrated in FIGS. 1 and 1' on a continuous basis;

FIG. 3 is an end view taken through plane 3 of FIG. 2 showing a portion of the apparatus thereof;

FIG. 2' is a plane view of a portion of the apparatus provided in FIG. 2;

FIG. 4 is an end view in cross section showing a modified form of the apparatus of FIGS. 2 and 3 and a modified reinforced panel;

FIG. 5 is an end view of a modified form of part of the apparatus illustrated in FIG. 2 and an internally reinforced panel material shown in cross section and produced thereby;

FIG. 6 is an end view showing apparatus for producing a modified form of composite sheet material having structural characteristics similar to that provided in the other drawings; and FIG. 7 shows in end cross section a composite sheet or panel produced by means of apparatus of the type illustrated in FIG. 6.

Illustrated in FIG. 1 is a portion of a sheet metal panel 10 having integrally formed conduits or ducts 12 provided between solid formations 11 of the sheet and referred to by notations 12a, 12b and 12c which are illustrated as extending substantially parallel to each other along respective lateral portions of the sheet. Such ducted sheeting may be fabricated in accordance with the teachings of U.S. Pat. No. 2,662,273 which initially provide a sheet having one or more strip areas which are void of metal such as illustrated at 13' and run parallel to and between the major faces of the sheet with the metal and the disposition of the strip volumes being such that the application of sufficient fluid pressure to said strip volume will cause the sheet material adjacent said strip volumes to outwardly inflate or bulge from the remaining portions of the sheet. In said Pat. No. 2,662,273, means are provided for outwardly deforming portions of the sheet adjacent the nonwelded strip areas thereof to extend from both of the major surfaces of the sheet. In my copending application Ser. No. 555,146 filed on Dec. 23, 1955, I provide means for expanding portions of the sheet outward from but one surface thereof unexpanded sheet outward from but one surface thereof to provide formations such as 12 of FIG. 1 by the use of a rigid platen and a deformable rubber blanket cooperating to retain one side of the panel or sheet flat while permitting inflation of portions of the other side of the sheet.

For the purposes of illustrating the various aspects of this invention, duct formation 12a is shown as having an interior volume 13a defined thereby and the portion 14a of the opposite wall of the sheet comprising a flat wall of said ducting, as being void of any supporting material other than fluid contained within said volume. Duct formation 12b is shown having a solid material 16 completely filling the interior volume 13b of the duct. Duct formation 12c defines a volume 13c interior thereof and the opposite wall portion of the sheet which is partially filled with a material 17 lining the inside wall thereof. A sheet or panel such as 10 may be provided in a predetermined shape and utilized, with interiorily reinforced formations such as provided at 12b or 12c which sheeting may also contain one or more duct formations such as 12a which are void of solid fillers.

The filler materials or formations, defined by the notations 16 and 17, may serve one or more of a plurality of useful purposes, the primary of which is to reinforce and strengthen the panel by preventing the inward buckling or collapsing of portions of the outwardly expanded walls of the ducting filled thereby. It is obvious that, as long as the wall formations 12 which expand outward from the main body of the sheet 10, are not indented, buckled or locally damaged, the full advantage of the rigidity imparted to the sheet by said formations is retained and to this end, various low cost filler materials may be employed within said duct formations. For example, the filler materials may comprise various, self hardenable fluid or liquid materials such as various mortars, Portland cement, ceramics, solid or cellular plastics or even metal injected into either the pre-formed ducting or said interfacial strip areas, prior to solidifying, and in a manner to effect the outward deformation or inflation of the metal sheet to provide either formations of the type illustrated in FIG. 1 or formations bulging from both surfaces of the ducted sheet 10.

A number of methods are hereinafter provided for fabricating sheeting of the type illustrated in FIG. 1 and articles thereof.

In a first method, the sheet of metal containing one or more slits or strip volumes extending parallel to the major surfaces of the sheet such as 13′ illustrated in FIG. 1, is provided in a nondeformed state and an injection nozzle is coupled to the strip volume by, for example, insertion into an opening thereto extending therefrom an edge of the sheet such as illustrated at 13′. Once coupling of said nozzle and the sealing thereof against the walls of the strip volume of the sheet is effected and all other openings to the strip volume are sealed off, a filler material in a fluent or liquid state is injected through the nozzle into the sheet to effect the expansion of the strip-like volume and the outward bulging of at least one wall thereof to provide a duct-like formation such as 12 which is completely filled with the bulk filler material such as illustrated 16. Thereafter the edge opening to the expanded volume is closed off such as by collapsing a portion of the expanded wall of the tubular formation or by allowing the liquid filler material thereafter to solidify. Depending on the characteristics of the filler material, the panel may be further fabricated to effect the solidification or partial solidification of said filler material. For example, if the filler material requires the transfer of heat therefrom to solidify, the panel may be immersed in a heat transfer liquid either prior to or after the injection of the filler material into the panel.

In another method, the panel may be preexpanded by means of a first fluid and thereafter filled or at least partially filled with the core material in a fluent or liquid state which is thereafter allowed or caused to solidify within the panel. Here again, closure of the end of the sheet tubular formation may be effected by either collapsing the end of the formation to cause the walls thereof to abut each other or by allowing the filler material to solidify. Further modifications to the above methods may include such post operations as welding the collapsed portions of the tubular formations of the sheet to assure closure thereof and further forming of the sheet either prior to or after expansion of the tubular formations therein such as rolling, bending or the like into an article of manufacture or a component of an article of manufacture.

The methods described hereinabove may be applied to the fabrication of sheeting or panels of metal which may be used as components of wall panels, containers, trays or other articles requiring an integrally stiffened sheet of metal. If the material injected to fill or partly fill the vein-like duct formations is a self-forming plastic capable of solidifying within the duct-formations 12 into a cellular material, it may be utilized to absorb vibrations or shock forces to which the panel is subjected during use, and/or serve as an insulating means.

FIG. 1′ illustrates a structure in a ducted metal sheet of the type provided in FIG. 1 with the exception that both portions of the sheet adjacent the strip-like, nonfused interfacial volume 13′ are permitted to become outwardly deformed as illustrated during the inflation process. As in the arrangements provided in FIG. 1, the outward deformation or inflation by any suitable fluid or, more preferably, by the liquid material injected into said volume which eventually hardens and becomes the supporting medium for the walls 12′a and 12′b which are shown as equally outwardly deformed in FIG. 1′.

In another method of fabricating a sheet structure similar to that shown in FIG. 1 at 12b having a vein-like duct reinforced with a hardened filler material, two sheets of metal are continuously rolled together in a rolling mill with portions of either or both sheets deformed as shown at 12a to form the wall or walls of the vein-like duct in the sheet provided when the two sheets are roll-bonded or otherwise welded into an integral formation comprising the panel 10. Simultaneously as the sheets are brought together and welded into an integral panel, a hardenable core material of one or more of the materials described hereinabove is continuously injected between the sheets into the volume 13a defining conduit 12a to solidify therein as the sheet is conveyed through or from the rolling mill. The hardenable filler material solidifies as the sheet is conveyed if not substantially at the time the sheets are roll welded together. In another procedure, the sheets comprising the finished panel may be formed with a strip-like volume such as 13′ void of metal and the filler material injected through a nozzle disposed inside or between the sheets adjacent the rolls or welding dies injected to expand the sheet with the formation shown at 12b. The following variations in the fabrication of such reinforced sheet are noted:

(I) Sheet 11 is continuously formed by continuously feeding two sheets of roll bondable metal together after at least one has been deformed by rolling or other means with one or more conduit wall formations 12a. The sheets are continuously roll-bonded together into a unitary sheet formation by pressure welding while nozzles disposed between the sheets and extending into the duct volumes 13a continuously inject a filler material to completely fill the voids or ducts 13a, formed by the deformed portions of the sheet(s). If the injected material is a self-expanding material such as rigid or flexible urethane containing a catalyst to foam and expand same, the mass flow of material between the bonding or welding sheets is such that the material will be permitted to expand into a cellular formation shortly thereafter which completely fills the duct voids and has a predetermined cellular structure designed to impart the desired characteristics to the composite panel structure.

(II) Sheet 11 is continuously formed by continuously feeding two or more sheets of weldable material of the same or different plastic, metal or ceramic or combinations of two or more of these materials into a roll welding fixture and oblique to each other prior to being brought into facial contact and welded together. At least one of the two sheets is provided with one or more parallel rib-like corrugations such as 12a therein prior to bringing the two together. A nozzle inserted between the two sheets and shaped to conform to and effect moving pressure seal with the inside walls of the formation defining the welded duct continuously injects one of the hereinabove mentioned self hardenable materials between the sheets at a constant and predetermined mass flow rate as or immediately after the two sheets are welded together, which material hardens thereafter to form a reinforcing means for the walls of the duct formation. If a thermosetting resin is utilized as the filler material, and resistance or other form of heat generating welding means is employed to weld the sheets together, then the heat so generated may be utilized to at least partly if not completely cure the injected resin or the composite sheet may be radiant or induction heated.

(III) In a third procedure, sheet 10 is continuously formed from at least two sheet formations at least one of which is extruded from plastic, ceramic or metal and contains one or more formations such as 12a formed therein to provide the wall of the duct. The sheets are fed continuously together against a nozzle, mandrel or array of same inserted and held between the sheets having tip portions frictionally engaged between the abutting sheets by the walls of the conduit formations so that reinforcing material injected therethrough into the duct formations will flow continuously into the duct formations without spillage or backflow. In other words, the tip of the nozzle(s) inserted between the welding sheets is sealingly engaged by portions of both sheets to permit the reinforcing material to be injected under pressure without backflow or leakage occurring.

FIG. 2 illustrates apparatus of the type described in methods I to III described hereinabove.

(VI) In a fourth procedure for producing a sheet 10 as illustrated in FIG. 1, the panel 11 is extruded to shape including the conduit formation 12b formed therein by extrusion and a filler material of the type described is injected through the extrusion mandrel defining the interior volume 13a into said interior volume wherein it solidifies as described.

(V) In a fifth procedure two sheets of roll bondable or weldable metal are continuously extruded or cast and rolled and are thereafter passed through a rolling mill and roll bonded together save in strip-like areas corresponding to interfacial volumes 13' of FIG. 1.

(VI) In a sixth procedure two sheets are extruded or continuously cast or rolled from metal or other material one or both of which are deformed with conduit formations such as 12'a and/or 12'b of FIG. 1' and are thereafter brought together in a rolling mill and roll bonded or welded together along the mating flat surfaces between the said conduit formation.

In FIGS. 2 and 3 is shown apparatus for continuously producing a reinforced sheet of metal containing a plurality of parallelly extending internally supported formations such as duct formation 12b in FIG. 1 by bringing two or more sheets together in a rolling mill, uniting same by welding or roll-bonding and simultaneously as they are welded, injecting a fluent filler material between the sheets which solidifies into formations such as 12b or 12'b for reinforcing tubed formations of the newly fabricated panel.

Illustrated in FIG. 2 are two sheets of metal, plastic, ceramic or laminates of these materials denoted 21 and 22 which are driven together from any suitable supply such as coil formations, extrusion presses, rolling or casting apparatus whereby portions of both sheets are brought into surface abutment and welded or otherwise bonded together in a rolling mill or laminating apparatus 20 so as to have a plurality of formations or ducts provided therein and of the type illustrated in FIGS. 1 or 1'. Notations 27, 28 and 29, 30 refer to power driven rollers which serve as guide and feed means for the sheets 21 and 22. At least one of the pairs of rollers, if not both, are operative to deform the sheet fed therethrough with a plurality of corrugations of the type illustrated at 12a of FIG. 1 and positioned so as to eventually provide duct formations in the resulting new sheet or panel which is formed in the rolling mill 20 which are capable of being filled with a reinforcing material such as the hereinabove described cellular or nonporous plastics, mortars, or the like. The rollers 23, 24 and 25, 26 are preferably shaped to accommodate the duct formations 12 as illustrated in FIG. 3 and to simultaneously effect welding or roll bonding of the sheet formations 21' between formations 12 to provide, in effect, a so-called tubed sheet.

Disposed between the converging sheets 21 and 22 and aligned with and engaging the inside walls of the corrugated formations 12b in the sheets are a purality of mandrels 34 defining injection means for the filler material. The nozzles or mandrels 34 are supported on a base 33 defining a header for the injection fluid which in turn is supported by a frame 32 which is rigidly affixed relative to the rolling apparatus. The nose 34 of each nozzle or mandrel 34 is designed so as to be compressively engaged by the two sheets as they are driven together and to effect a seal between the surface of the nozzle and the almost abutted or abutted sheets. Filler material may thus be injected through an opening in the end of the nozzle under pressure without backflow and leakage. In another form, the sheets may be disposed downwardly and filler material flow-controlled so as to reduce or eliminate the need for effecting a seal between the nozzles and the sheets being welded together in the welding mill 20. The nozzles may also cooperate with the rolls 23, 24 in helping to form the sheets with corrugations or to change the shape of the corrugations already formed therein. In other words, if the sheets 21, 22 are not already corrugated, nozzles 34 may cooperate with the rolls 23, 24 in deforming either or both sheets with said duct forming corrugations as they are fed into the rolling mill and to simultaneously inject filler material into the voids defined by the corrugations and the adjacent welded portions of the sheet formed thereafter in the mill. Resistance, pressure or heat welding means may be employed to bond the two sheets together and the same heat conducted through the sheets may be used to expand, cure or otherwise beneficially affect the injected filler material. If the two sheets 21 and 22 are supplied of thermoplastic polymers such as rigid or flexible polyvinyl chloride, polyallomer or the like, they may be heat sealed together by means of circular electronic heat sealing, radio-frequency dies.

FIG. 2' illustrates a portion of the header 33 and bank of injector nozzles or mandrels 34 secured thereto and laterally spaced so as to be each aligned with a particular corrugation in the sheet 23 formed by roll-bonding the two sheets 21 and 22 together. Two nozzles 30a and 30b are shown each secured to a laterally extending header duct 33' which is supported by a plurality of longitudinal members 33" containing one or more pipes or ducts connected to the duct in 33' to which the passageways in the nozzles are coupled. The source of filler material is located within or beyond the mount 32 for the header formation 33 and is preferably controlled by means of a constant flow pump or pressurizing means (not shown). An automatic system may also be provided for regulating and predetermining the rate of flow of filler material injected into the sheet 23 by sensing the velocity of said sheet and generating a feedback signal which is compared with a reference signal whereby the difference between said feedback signal and the reference signal is utilized to vary the rate of flow of filler material so that it at all times remains constant with respect to the feed of sheet 23. In turn, the roll-bonding operation may be controlled so as to be proportional to the rate of formation of sheets 22 and 23.

In FIG. 3 portions of the rolls 24 and 24' defining the first stage of the rolling mill 20 are illustrated as is a portion of an injector nozzle 34 shown in cross section. The shape and function of the rolls defining the first stage of the mill 20 will depend on the operation and degree of rolling performed by the advanced rolls 27, 28 and/or 29, 30. In other words, the rolls 24 and 24' may be provided primarily to conform to the corrugations already provided in sheets 21 and 22 and to effect filling and roll bonding the portions 23' between the corrugations or they may additionally serve to further shape the corrugations to provide a plurality of conduits of predetermined shape. In FIG. 3, portions 24a and 24c of the roll 24R are utilized to roll-bond those portions of the converging sheets 21 and 22 adjacent the corrugations together by pressure welding the two which may be effected with or without the application of heat to both sheets at the rolling mill or prior to their convergence into the rolling mill. While the rolls 24 and 24' preferably extend across the width of both sheets and contain a plurality of corrugation receiving indentations 24b at the proper lateral spacing, it may also comprise a plurality of short roll sections as illustrated, which are spaced apart on a common shaft 24S which is supported at the side of the rolling mill and power rotated. If such short sections are utilized, roller spacing may be varied depending on the spacings between corrugations and the corrugated sheet and further roll-bonding of the two sheets is effected during their passage between the rolls, such as 25, 26 situated beyond the first stage of the rolling mill.

The apparatus illustrated in FIGS. 2 to 3 may also be utilized, if properly modified, to produce elongated sheet metal formations containing one or more unexpanded strip-like volumes disposed between the surfaces of the sheet such as 13' of FIG. 1. In other words, it is hereby proposed, that the injector heads 34 be disposed between two flat sheets of metal, such as aluminum or copper, at the point where they converge and enter a rolling mill, as illustrated in FIG. 2, and be adapted to provide between said sheets or on the surface of at least one of said sheets, strip-like deposits of a stop-weld material of the type described in U.S. Pat. 2,662,273 to prevent the eventual welding or roll-bonding of the sheets in the areas where said material is deposited. If the nozzles are disposed as illustrated in FIG. 2 immediately against both sheets where they converge and abut each other between rolls 24 and 24', the tips of the nozzles would be modified to converge to substantially flat ends since the corrugations are not present and the material deposited from each nozzle would either be injected under pressure between the sheets or flowed continuously onto the surface of either sheet as it travels past the nozzle.

In a further form of the invention, the pressure of the material injected through the respective nozzles or mandrels of the bank 34 may be operative to at least partially expand the corrugations in the sheet as they enter the rolling mill, provided that a fluid pressure seal is maintained between the surface of the mandrels and the converging sheets in cooperation with the rolls of the first stage of the mill.

The apparatus illustrated in FIGS. 2, 2' and 3 may be further modified to provide so called tube-in-strip material such as sheet 11 of FIG. 1 having one or more conduit formations such as 12a and/or 12b provided therein. This may be effected by providing either or both of the rollers 24, 24' comprising the first stage of the rolling mill 20 made of or covered with a compressible material such as flexible rubber or plastic capable of at least abutting the sheets together prior to roll bonding but permitting inflation of one or more strip-like volumes 13' by means of the pressure of a fluid injected through one or more nozzles such as 34 illustrated in FIG. 2' and disposed between the sheets in surface engagement therewith as they enter said rolls. In other words, while the rolls are operative to retain portions of the abutting sheets in surface abutment with each other, the pressure of the fluid injected through the nozzles is sufficient to outwardly deform those portions of the sheet in alignment with said nozzles into the deformable portions of the roll or rolls. The injection fluid may be air or a self-hardenable material as described while the second stage as well as further stages of the rolling mill would be shaped as illustrated in FIG. 3 or modifications thereof to roll-bond or weld those portions of the abutted sheets which do not comprise walls of the conduits.

In still other forms of the invention, the rolling mill may be further modified to perform one or more of the following operations on the material passed therethrough which may comprise said two sheets or a single extruded sheet;

(a) The rolling mill may be operative to further reduce at least portions of the sheet or sheets fed therethrough as the material is fabricated as hereinabove described.

(b) The rolling mill may be operative to emboss the portions of either or both surfaces of the sheet or sheets fed therethrough.

(c) The rolling mill may be operative to form and bend portions of the sheet or sheets fed therethrough such as in the formation of angles or structural shapes or tubing and to weld edge portions of the tubing.

(d) The rolling mill may also be operative to pierce or cut portions of the sheet into strips while simultaneously performing the hereinabove operations.

(e) The rolling mill or auxiliary apparatus downstream thereof or situated within the mill may be operative to coat portions or the entire exterior surface of the stock treated thereby or to continuously print repeating patterns on either or both surfaces of said material as it is continuously fed.

(f) The rolling mill may be operative to roll additional sheets, strips or other shapes against either or both surfaces of the material 23 and to weld or roll-bond said materials together into a unitary formation.

(g) The rolling mill or the advance set of rollers through which the lowermost of the two sheets is passed may be operative to form corrugations therein and means may be provided such as a plurality of nozzles to dispense a self-expanding resin into one or more of the channels formed by the corrugations in the sheet as continuous streams of said plastic whereafter further stages of the rolling apparatus are operative to bring the uppermost sheet into surface abutment with the lower sheet and to bond or otherwise secure the two sheets together prior to complete expansion of the self-expanding or blown cellular plastic materials so that after the two sheets are so joined the core material will expand to completely fill the voids or channels defined by the corrugations.

(h) For certain products to be produced from reinforced sheet material of the types illustrated in FIGS. 1 and 1', it may be desirable to provide said expanded or corrugated and internally filled sheet with the filled rib formations extending along only a portion or portions of the panels cut from said continuously formed material. This may be effected by either collapsing the end portions of the corrugations in each length cut from the formed sheet to compress and/or remove the reinforcing filler material therefrom or by corrugating or expanding only portions of the rolled sheet panel as it is fed and only filling the portions so corrugated or expanded. One of several techniques may be employed including shaping the rolling dies used to shape the corrugations so as to shape corrugations of predetermined length with flat portions of sheet between corrugations which are not filled or injected with filler material. Or a press such as a flying bed press or the like may be operated to engage the surfaces of the corrugated sheet after injecting filler material therein to compress the corrugations flat while forcing the filler material out of the flattened sections and before it has solidified. The sheet may then be cut by a flying cutter along the collapsed portions or multiples thereof and may be further formed or otherwise operated on to fabricate articles or assemblies thereof.

(i) In another form of the invention, the corrugating means such as rollers 27, 28 or 29, 30 may be replaced or supplemented by roller printing means adapted to continuously print patterns of stop weld material which repeat along predetermined lengths of the sheet to which they are applied and are inflatable either after the sheet 23 is cut to lengths each of which contains one or more complete patterns and/or by controlled positioning of one or more fluid injectors such as 34 and automatically controlled injection of inflation fluid between the sheets into the roll bonded sheet formation passageways to outwardly expand the newly formed passageway portions of the freshly roll bonded panel 23. The operation may be accomplished by the continuous or intermittent movement of the sheet 23. In other words, sheet 23 may be stopped during its inflation or in motion. Injection head 34 may be advanced to sealingly engage between the abutting sheets in line with a passageway or passageways to effect inflation thereof and/or filling with filler material and retracted thereafter so as not to remove printed stop weld material applied to the inside face of the sheet by said printing means. The entire process may be controlled by a multi-circuit self recycling timer or other suitable control means which is cyclically operative to control servos, valve actuators and other devices for preset and timed advancing of the injectors, fluid injection and retraction thereof, movement of the sheet driving means, etc. Such automatic apparatus may also be operative for the controlled filling of reinforcement material into predetermined portions of the sheet passageways as described.

Variations in the apparatus illustrated by means of the apparatus shown in FIGS. 2 and 3 include, in addition to the continuous formation of either or both sheets from a molten state by continuously rolling, casting and/or extruding the material comprising said sheets, apparatus for forming said corrugations provided therein to define the duct formations by extruding, casting or rolling of said formations as the sheet itself is formed or by passing the extruded or cast sheets through rollers.

Composite panels may be fabricated by a modified form of the apparatus illustrated in FIGS. 2 and 3 as shown in FIGS. 4 and 5. In FIG. 4, an internally reinforced panel 36 is provided by bringing together two sheets 37 and 41 of the desired material in a mill or welding fixture including pairs of rolls 45, 46 and 47, 48 adapted to engage and weld edge formations or borders 39, 43 and 40, 44 of both sheets leaving central portions 38 and 42 of the sheets separated from each other and capable of being filled as described with a bulk material. A suitable material for many types of panels is a self-expanding plastic, metal or ceramic or one which is blown into a cellular formation between the welded sheets and solidifies immediately thereafter into a solid core 49 supporting the two sheet formations in an integral and unitary panel formation. Sheets 37 and 41 may be preshaped into the illustrated flanged channel-like shapes or may be so formed by means of the rolling dies 45, 46 and 47, 48 as they are fed therethrough. Said formations 37 and 41 may be freshly extruded, cast or provided from rolls or coils, or may be integrally formed together in a single box-like formation by extrusion, into which the filler material 49 is injected through the extrusion mandrel used to define the shape of the inside wall of said formation. Or, apparatus of the type provided in FIGS. 2 and 3 may be used to form the composite panel or sheet 36 of FIG. 4 which may be made of rigid and/or flexible materials. The illustrated flanges defined by border portions 39 and 40 of sheet 37 and 43, 44 of sheet 41 may be retained for fastening the panel to other members or may be trimmed off.

As stated, fabrication of the panel 36 and its structure may be subject to a number of variations including corrugating or otherwise deforming capping sheet portions 38 and 42 and internally reinforcing said sheets with stiffening portions provided by extrusion or rolling of said sheets or by separate extrusions, sheet formation or the like fed between the two sheets as they are brought together. Such internal reinforcing members may be welded or bonded to the inside surfaces of both sheets and extend completely or partly across the central volume defined by the sheets.

In another form, the filler material 49 may comprise a plurality of strip or narrow sheet formations of expanded plastic of the type described with voids between adjacent strips or may comprise rigid cellular plastic formations interposed between flexible cellular plastic formations which are simultaneously extruded or flowed between the converging sheets 37 and 41 and completely fill the interior volume defined by said sheets. If sheets 37 and 41 are flexible plastic, the use of internally applied rigid and flexible formations of cellular plastic may be so applied as to impart desirable cushioning and reinforcement characteristics to the composite sheet. The rigid cellular plastic may extend as a core element or elements through the central portion of core material 49, between the inside surfaces of sheets 37 and 41 or in any suitable manner through the volume interior of the capping sheets. Also, portions of said capping sheets may be inwardly deformed to abut each other and welded together to form separate elongated conduit formations as shown in FIG. 5.

The filler material 49 may comprise an expanded or expanding cellular plastic material, such as polystyrene, polyethylene, polyurethyene or the like injected between formations 38 and 42 in abutted sheets 37 and 41 as described FIG. 2 and at a mass rate of flow such that said material will expand and completely fill the interior volume upon solidification thereafter. The rolling dies 45, 46 and 47, 48 may comprise electrical resistance and/or pressure welding means operative to continuously weld the flange formations of the sheets together.

In FIG. 5 is shown an apparatus of the type shown in FIGS. 1–4, modified to provide a plurality of parallel, internally reinforced duct-like formations in a single panel or sheet. The arrangement may be utilized to produce flexible, as well as rigid, panel formations. Two sheets 51 and 52 of rigid or flexible material such as rigid or flexible formulations of thermoplastic materials or polymers are brought together as shown in FIG. 2 over the surfaces of a plurality of injection nozzles and between respective pairs of roller welding dies 54, 55; 56, 57; 58, 59. If thermoplastic resins are employed, the dies may comprise heated rollers or wheel-type electronic sealing dies driven at the speed of the sheets to engage and weld formations 51a, 52a; 51b, 52b; 51c, 52c and 51d, 52d between the corrugated formations 51' and 52' in said sheets. If, for example, sheets 51 and 52 are made of flexible polyvinyl chloride or polyethylene, the injected filler material may comprise cellular or self-foaming flexible vinyl or polyethylene which are retained in the tubular duct formations or pockets formed when portions of the sheets therebetween are heat or electronically sealed together. The dual sheets may also be replaced by a single extrusion of the same or similar shape, into the voids of which are injected separate streams of self-expanding or blown cellular plastic after or during the extrusion formation of the capping sheet formation. Apparatus so provided will not require heat sealing dies but rollers as illustrated may be utilized to guide, drive and shape the freshly extruded, composite sheet formation until the expanding plastic has substantially or completely expanded to shape. Said material may be injected through the extrusion die mandrel utilized to form the interior surfaces of the duct formations.

If two sheet formations, such as the illustrated sheets 51 and 52, are fed into the laminating and welding apparatus 50 from respective extrusion dies or die openings in a single extruder die, they may be welded together along strip-like formations 51a, 52a; 51b, 52b; and 51c, 52c, etc., by the application of pressure alone through the respective pressure welding wheel pairs 54, 55; 56, 57 and 58, 59. Or said welding wheels may be resistance heated or may comprise respective pairs of electronic heat sealing dies power rotated at substantially the speed at which the sheets are driven through the laminating apparatus.

If the sheet formation of FIG. 5 is extruded to the shape illustrated, the filler material may be injected at a constant rate into the respective void or conduit formations defining volumes 53 and expanded to completely fill out said volumes prior to solidification.

The composite panel or sheet article thus formed may be rigid or flexible depending on the materials comprising the skin or sheet formations and the filler material therefore. Typical combinations of material may include (a) flexible polymeric materials such as flexible and expanded vinyls, polyethylene, polypropylene, polyallomer, etc., (b) rigid and flexible polymeric materials such as rigid or flexible nonporous and cellular formulations of vinyl, urethane, polystyrene, polyethylene, etc., (c) sheet metal and rigid cellular polymeric materials such as expanded vinyl, polystyrene, polyethylene, etc., (d) sheet metal and expanded ceramic or cellular materials such as foamed glass or other ceramics, etc., (e) sheet metal and expanded or cellular metal, (f) sheet metal filled with nonexpanded bulk material such as mortar, cement, thermoplastic or thermosetting resins.

Further variations in the laminating apparatus and methods illustrated in FIGS. 2 to 5 include the following apparatus and material modifications:

(a) The injection heads 34' may be operative to extrude or otherwise present one or more formations in the shape of strips, sheets, rods or other shapes which solidify by the time they are driven between the converging sheets and become disposed between deformed passageway portions of the sheet or sheets and sealed therein when the sheets are welded or bonded together. The filler material which may be continuously fed, may also comprise cushioning, insulation or the like fabricated of resins, ceramics, metal or the like continuously extruded from a plurality of die openings with the die 34 disposed sufficiently behind the converging sheets to permit solidification of the extruding material. Since many resinous and ceramic extrusion materials are solid or defined to shape when they leave the extrusion die, the multiple heads 34' may also be disposed as shown in FIGS. 2 and 3.

(b) The reinforcing strips or formations may be metal such as formed rods or wires supplied from coils or fed, from a rolling and drawing mill in which they are continuously formed, through guide means such as 34 between the sheets to become encapsulated in respective pasageways thereof formed by corrugating the sheets as described or by deforming portions of the two sheets as they are fed into the rolling mil lover the constantly fed wires. Said fillers may also comprise single or multiple strand wire conductors covered or coated with ceramic or plastic insulating material and fed from a coiled supply thereof or means for continuously forming and coating said wires, between the sheets as described to become encapsulated or embedded in the sheet 23 and form a unitary panel with enclosed conductors and utilizable as a wall panel for enclosures, rooms, vehicle bodies, etc.

(c) Rolls 27, 28 and 29, 30 may be operative to provide strips or layers of insulating material on respective surfaces of the aluminum (or other metal) sheets 21 and 22 in the corrugated portions thereof or aligned with those portions which become corrugated and dispensing apparatus 32 may be operative to dispense conducting strips or feed round or flat metal wires between the sheets aligned with opposed strips or layers of insulating material so as to become electrically insulated from both sheets after said sheets are fed together and welded or roll bonded along the portions between those containing said wires. The heads 34 and feeding means therefore may also be modified to flow or guide a flat strip conductor between the sheets after flowing strip-like coating of insulating material against each of the sheets aligned with the conductor which becomes insulated thereby from the metal of both sheets and encapsulated within said insulation and said sheets when the sheets are roll-bonded together in the rolling mill. In one form, the encapsulated conductors may comprise metal powder in a conducting plastic or metal powder which is melted by induction or other means as it is injected between the sheets and forms unitary conducting strips. Said induction means may be disposed in the injection means or the rolling mill. The sheets may be flatly roll-bonded or corrugated as described.

(d) In still another form of the invention, the members disposed between the sheets may comprise resistance heating elements formed and fed by one or more of the hereinabove described means, and in one or more of the described forms preferably insulated from both sheets as described.

(e) In another form of the invention, the encapsulated members may comprise a plurality of round or flat tubes of the same or different metal than that comprising sheets 21 and 22 which may serve as fluid conduits for flowing corrosive or pressurized material through the sheets.

FIG. 6 illustrates an apparatus for producing a portion of a composite panel or new type of multilayer or composite sheet material. The apparatus includes a conveyor 66 which may comprise a closed loop belt or plurality of power operated rollers for receiving, guiding and driving a coil-fit, continuously extruded, continuously rolled or calendared sheet of material such as metal, plastic, or ceramic beneath a plurality of laterally spaced nozzles or discharge devices referred to by the notations 64a, 64b, 64c, etc., each of which are connected to a common header 64 which feeds a fluid material to said nozzles from an inlet line 65 connected to a pressurized source of said fluid.

In a preferred form of the invention means are provided for feeding the fluid at constant rate through each of said nozzles against the upper surface 62' of the sheet 62 as it is driven past said nozzles and is deposited thereon as a plurality of strip-like formations 65a, 65b 65c, etc. The material so dispatched as parallel deposits on the upper surface 62' of 62, may be either the same or of a different formulation than the material of which sheet 62 is made. For example, said material may comprise a self-expanding or blown cellular plastic adapted to adhere to the upper surface of 62 and to provide formations, as illustrated, or formations which expand to a predetermined depth or height after they are so deposited. Said formations may thus become insulating spacer elements for a composite sheet 63 of the type illustrated in FIG. 7 which is shown having a tapping sheet 67 secured to the base sheet 62 and supported by the expanded strip-like portions 65' of the deposited formations. Thus, volumes 68 between adjacent expanded formations 65' contain entrapped air which may serve as insulating means and the formations 65', in addition to serving as insulating means, may also be utilized to support the two sheets apart from each other. The formations 65' may be made of rigid, semirigid or flexible cellular plastic, metal, or ceramic.

Variations in the apparatus of FIG. 6 include (a) the provision of conventional powered drive means to effect the lateral, controlled movement of header 64 back and forth across the sheet 62' as said sheet is driven therepast to provide sinusoidal formations 68 of the spacer or expanded material, (b) the provision of a plurality of fixtures such as 64 and means for oscillating said fixtures back and forth across the upper surface 62' of sheet 62 so as to provide lattice-like or net-like formations of the deposited material which are compressed in the crossover areas when the two sheets 67 and 62 are brought together in a fixture of the types illustrated in FIGS. 4 or 5. In other words, the areas of the sheets between the formations 65' may be compressibly engaged and welded together as illustrated in FIG. 5 in a manner to provide a panel formation of the type shown in FIG. 5 or a modification thereof.

In another modified form of the invention, extrusion means may be employed to provide the sheet 62 as a freshly extruded polymer and the fluid ejected from the nozzles attached to header 64 may be a blowing agent which is operative to blow or expand portions of the sheet 62 intersected by said streams. The resulting formation, when the sheet portions are fully expanded, may vary from a sheet containing strip-like volumes of nonexpanded plastic interposed between strip-like volumes of plastic which is completely expanded to a sheet formation comprising a layer of totally nonexpanded plastic and a layer or strata of the same plastic thereabove containing strip-like or band-like formations of expanded plastic which project beyond the upper surface 62' a predetermined degree and provide upper surfaces against which a second sheet may be laminated in the manner illustrated in FIG. 7. The nozzles 64a, 64b, etc., may be disposed immediately in front of the sheeting extrusion die from which sheet 62 is extruded or may comprise holes or conduits provided in the wall of the die used to extrude the sheet 62 for flowing predetermined quantities of a blowing agent directly into the freshly extruding material flowing therethrough so that, as the sheet exits from the die, strip-like portions of the upper strata thereof expand into formations of cellular plastic projecting outward from the upper surface of the sheet to provide a composite cellular and noncellular rigid or flexible sheet material.

In another form of the invention structures of the type illustratde in FIGS. 4 and 5 may be formed by providing an extrusion for extruding a flexible or rigid polymeric material over a mandrel disposed within a die and means for injecting a blowing agent from the mandrel into the central portion of the extrusion which blowing agent is operative to only expand the core portion of the extruding element.

It is noted that the composite assembly 63 illustrated in FIG. 7 may also be produced by apparatus of the type illustrated in FIG. 2 wherein a plurality of injection nozzles 34 are spaced as illustrated in FIG. 2' and are adapted to full blown or self-expanding cellular plastic material onto the bottom sheet 22 as the two sheets are driven together and passed through a modified form of the rolling mill adapted to roll-bond or continuously weld border portions 67' of the upper and lower sheets together to provide the composite sheet or panel formation illustrated in FIG. 7 upon complete expansion of the formations 65' between the two.

Apparatus for fabricating an extruded article, portions of which are expanded or foamed while other portions, as described, remain unexpanded, may include an extruder for a solution of gas in molten plastic. If the plastic is heated as it emerges from the extruder the gas will expand forming bubbles which form cells in the plastic. Such a process has been developed by R. H. Hansen, of Bell Telephone Laboratories. To utilize this process to produce partially expanded extrusions as hereinabove described, only strip-like areas or portions of the extrusion are heated by radiant energy or conduction means. The radiant energy may be derived by conventional means for focusing or otherwise directing bands or spots of energy such as intense light or heat against selected areas of either or both surfaces of the extrusion as it moves along. Sufficient heat may be conducted to the plastic through a plurality of heated surfaces applied to the extrusion by means of heated strip portions of the die, wheels or bars engaging the extrusion downstream of the die, etc. Heated bars or mandrels disposed in the throat of the extruder which may or may not define the inside surface of the extrusion but which are in surface contact with inside or core portions of the extrusion may be used to heat internal portions of such an extrusion. If said extrusion is fabricated of a flexible polymer such as plasticized vinyl or low-density polyethylene, said heated devices may be operative to produce a flexible blanket of the type shown in FIG. 4 having a skin covering and a flexible foam core. They may also be utilized to produce rigid panels having expanded plastic cores.

Such apparatus may be operative to inject gas into the central portion of an extrusion chamber to enter the molten plastic being delivered by the extrusion screw to the extrusion die. Apparatus is operative to dissolve the gas in the plastic before it reaches the die. If fine carbon black particles are added to the solution of gas in the molten polymer and means are provided for heating the plastic as it emerges from the extruder, the plastic may be caused to expand in the plastic containing the carbon black particles to a substantially greater degree than if the particles are not present. The particles serve to genearte hot spots or hot internal areas which heat the gas generating bubbles within the plastic which form cells therein for expanding the plastic. In other words, the hot spots permit nucleation of the bubbles within the plastic when heated. A composite article having portions of an extrusion made of expanded or cellular plastic while other portions thereof are unexpanded may thus be produced by apparatus for: (a) simultaneously extruding two plastics into a single extrusion, one a self-expanding polymer and the other a nonexpanding plastic, one inside the other or one on the other to provide formations as described; (b) simultaneously extruding a heat-expandable plastic as described one inside of the other, one or the other or in side-by-side array and heating the extrusion to cause the heat-expandable plastic to become cellular; (c) extruding a heat expandable plastic as described and heating selected areas of the extrusion either as it extrudes or after it is shaped into an article to cause selected strip or band portions of the extrusion to expand. Apparatus may also be provided for forming a sheet or other formation and simultaneously thermoforming same to a predetermined shape and expanding a portion of the thickness or stratas on either or both major faces thereof by means of the heat used to soften the sheet for thermoforming it to shape. The heating and expanding of forming of selected portions of the sheet or other shape may be effected by the application of a heated die element to the surface, by electronic heat sealing die means which generate heat in the particles in the plastic containing the gas and expand the gas, by induction heating means through the field of which the extrusion passes and operative to inductively heat metal or other particels in the plastic to expand the gas therein or by conduction of heat to the extrusion from the die walls or the mandrel situated in the throat of the extrusion die. Such a mandrel may be used merely to heat the core of the heat expandable extrusion to form an expanded, cellular portion of the extrusion surrounded by nonexpanded plastic, the cross section of the expanded core portion depending on the shape of the mandrel and the amount of heat transferred therefrom to the extrusion. In another form, the heated mandrel may also include means for shaping the inside wall of a tubular extrusion and for heating a portion of said wall including the inside surface thereof to form a tube-like extrusion with a core of expanded plastic. If a second plastic is introduced through the mandrel which is not heat expandable it may provide a nonporous interior coating on the cellular core portion. Or a wire may be fed through the mandrel to be coated by the heat-expandable plastic. Induction heating means for heating the wire may be employed as said wire leaves the extruder to expand just an annular portion of the plastic covering therefore leaving the outer layer of said plastic in an unexpanded condition.

In another form of the invention, a suitable source of radiation may be used to apply heat to a formation of heat expandable plastic through a mask which mask is operative to prevent the heating and expansion of certain selected portions of the plastic.

The plastics defined above may be rigid or flexible formulations per se or combinations of same with each other either of which forms either the expanded or nonexpanded portion of thhe extrusion. In other words, both cellular and noncellular portions of the extrusion may be made of rigid, semirigid or flexible plastic and the core may be flexible while the nonexpanded portions are rigid or vice versa.

Other plastic foaming or expanding apparatus which may be applied to provide an extruded or otherwise formed article of cellular and nonexpanded portions include means for injecting blowing agents or gas into the semimolten plastic to form bubbles therein and means for generating ultrasonic energy within the molten plastic to cavitate same. Such apparatus may include an injector or mandrel positioned withtin thhe throat of the die of the type illustrated in FIG. 2', for example, to provide an extrusion having surface side-by-side or core portions which are expanded or nonexpanded and adjacent portions which are expanded or nonexpanded. Thus apparatus for effecting the selective injection of blowing agents into selected portions of an extrusion while in a semimolten or molten state or the selective injection of gas or selective cavitation of predetermined portions of an extrusion may be employed to produce extrusions of the type described as illustrated. The extrusions include tubular formations with core and/or outer formations made of expanded plastic or most any extrudable shape with one or more expanded plastic portions and one or more nonexpanded plastic portions of the same or different polymers having the same or different formulations.

For example, it is to be noted that the apparatus of FIGS. 1 to 6 may be used interchangeably to form composite sheet or slab-like materials of the type illustrated. The filler material dispensing means of FIG. 6 (i.e., the multiple nozzles or extrusion heads 64a, 64b, 64c, etc.) may be employed to dispose space separated strips of filler material which remain separated or to completely cover the surface of a sheet having an upwardly facing surface such as sheet 22 of FIG. 2, sheet 42 of FIG. 4 or sheet 52 of FIG. 5. For example, the sheet 22 of FIG. 2 may be disposed horizontally when said filler material is flowed or extruded onto its upper surface. Roll-forming means such as shown in FIGS. 2 and 3 may be modified to form the sheets of FIGS. 4, 5 and 7. Also, if the extruder 32 of FIG. 2 is operative to form a sheet or strips or other shapes of thermoplastic material such as polystyrene, polyethylene, polyurethane, poly-vinyl chloride, etc., which is in a modable condition by the time it becomes disposed between the capping sheets 21 and 22, the nozzle 34 may be eliminated and the extruder may be disposed a distance from the engaged portions of the sheets to feed one or more extrusions onto the upper surface of sheet 22 near or at the region where the sheets converge and engage each other with said extrusions being carried along to fill the voids defined by the passageways formed in the compressed and welded sheets by the corrugations formed continuously therein by the rolling mill. If the extrudate is a polymer containing a blowing agent which operates to expand the plastic into a cellular mass after it leaves the extrusion die, then in certain instances, such extrudate may be of smaller cross section than the passageway or passageways formed in the sheet assembly and may be easily passed into the passageway by proper flow control thereof to expand in situ thereafter to fill or partially fill said passageway or passageways.

I claim:

1. Apparatus for forming composite sheet material comprising a combination:
   (a) means for continuously supplying and feeding a first sheet of material,
   (b) means for continuously feeding and supplying a second sheet of material,
   (c) means for driving and guiding said sheets together in a manner whereby said second sheet has an upwardly facing surface facing said first sheet, and means for deforming at least one of said sheets outwardly from the other sheet to form a longitudinal corrugation in said sheet,
   (d) a supply of expandable plastic material,
   (e) delivery means for continuously flowing said expandable plastic material on to the upper surface of said second sheet in alignment with said corrugation,
   (f) means for expanding said plastic material in situ on said upper surface of said second sheet and
   (g) means for roll-bonding said first and second sheets together to form a unitary composite sheet of said first and second sheets with said expanded plastic material disposed therebetween and supporting said two sheets.

2. An apparatus in accordance with claim 1, including means for continuously deforming one of said sheets to provide a continuous passageway with the other of said sheets when the sheets are brought together within which passageway said expandable plastic material is flowed.

3. An apparatus in accordance with claim 1 including means for deforming both said sheets as they are fed to provide a continuous passageway between said sheets when the sheets are brought together within which passageway said expandable plastic material is flowed.

4. An apparatus in accordance with claim 2, said deforming means being operative to form continuous band-like portions longitudinally along the deformed sheet and a continuous raised portion therebetween defining the wall of said passageway, and means for abutting said band-like portions to the facing surface of the other sheet and welding the abutting surface together to form an enclosed passageway for retaining said expandable plastic material therebetween.

5. An apparatus in accordance with claim 3, said deforming means for both said sheets being operative to form a plurality of continuous corrugations in said sheets as the sheets are brought together prior to delivering said plastic material thereto.

6. An apparatus in accordance with claim 3, said deforming means being operative to form a plurality of continuous, parallel corrugations extending longitudinally along said sheets with the corrugations in one sheet being aligned with the corrugations in the other sheet and means for abutting those portions of said sheets between the corrugations together including roll welding means for continuously welding the sheets together.

7. An apparatus in accordance with claim 1, said delivery means being operative to dispense said expandable plastic material as a plurality of separate streams onto to upper surface of said second sheet.

8. An apparatus in accordance with claim 7 wherein the delivery means comprises a plurality of separate nozzle means operative to flow said expandable plastic material in a manner such that it expands into space separated portions of cellular plastic material between said sheets with voids defined therebetween.

9. An apparatus in accordance with claim 1, said means for continuously supplying said first and second sheets comprising extrusion means for forming said sheets on a continuous basis.

10. An apparatus in accordance with claim 9, in which said extrusion means is operative to supply at least one of said sheets with a continuous corrugation extending longitudinally along the complete length of the sheet to define a passageway with the other sheet for retaining said plastic material therebetween.

11. An apparatus in accordance with claim 1, said sheet deforming means comprising an injection means having an injection head disposed between said first and second sheet materials and means for providing a seal between said injection head and the surface of said sheets as the sheets are driven together.

12. An apparatus in accordance with claim 11, said sheet deforming means including roll-forming means, said injections means operative to cooperate with said roll-forming means to shape at least one of said sheets with a corrugation so as to form a passageway into which said plastic material is injected.

13. An apparatus in accordance with claim 11 said injection means comprising a plurality of injection heads which are laterally disposed between said sheets and operate to cooperate with said roll-forming means to shape at least one of said sheets with a plurality of corrugations forming passageways, and means for delivering said plastic material to each of said injection heads for injecting said material into each of the passageways defined by said corrugations.

14. An apparatus for forming composite sheet material comprising in combination:

means for continuously supplying and feeding a first sheet of material, means for continuously supplying and feeding a second sheet of material, means for driving and guiding said sheets together, sheet deforming means including a plurality of cooperating deforming rolls disposed to engage the outer surfaces of said sheets as they are brought together, and a deforming head disposed between said sheets and cooperating with said deforming rolls in shaping at least one of said sheets to provide a longitudinal corrugation therein and means for bonding the contacting longitudinal portions of the two sheets brought together between said deforming rolls.

15. An apparatus in accordance with claim 14, including a plurality of deforming heads disposed between said sheets and cooperating with said deforming rolls to provide a plurality of corrugations in both of said sheets and cooperating with said deforming rolls to provide a plurality of corrugations in both of said sheets as they are brought together.

References Cited

UNITED STATES PATENTS

| | | | |
|---|---|---|---|
| 2,547,880 | 4/1951 | Meyer et al. | 154—594 X |
| 2,578,140 | 12/1951 | Krupp et al. | 156—79 X |
| 2,898,626 | 8/1959 | Alderfer et al. | 156—78 X |
| 2,973,295 | 2/1961 | Rodgers | 156—79 X |
| 3,166,829 | 1/1965 | Lemelson. | |
| 3,246,058 | 4/1966 | Voelker | 156—79 X |

ROBERT F. STAHL, Primary Examiner

U.S. Cl. XR.

156—79; 264—47; 29—155